(12) United States Patent
Matsumoto et al.

(10) Patent No.: US 8,844,832 B2
(45) Date of Patent: Sep. 30, 2014

(54) PRODUCTION PROCESS OF NON-CONTACT INFORMATION RECORDING MEDIUM

(75) Inventors: Yoshiyasu Matsumoto, Tokyo (JP); Ryuichi Hiramoto, Tokyo (JP); Aya Shirai, Tokyo (JP); Asao Matsushima, Tokyo (JP); Ken Ohmura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 70 days.

(21) Appl. No.: 13/533,518

(22) Filed: Jun. 26, 2012

(65) Prior Publication Data

US 2013/0000836 A1    Jan. 3, 2013

(30) Foreign Application Priority Data

Jul. 1, 2011    (JP) ................. 2011-147143

(51) Int. Cl.
| | | |
|---|---|---|
| G06K 19/07 | (2006.01) | |
| H01Q 1/22 | (2006.01) | |
| H01Q 1/38 | (2006.01) | |
| H01Q 7/00 | (2006.01) | |
| G06K 19/077 | (2006.01) | |

(52) U.S. Cl.
CPC .............. *H01Q 1/2216* (2013.01); *H01Q 1/38* (2013.01); *H01Q 7/00* (2013.01); *G06K 19/07773* (2013.01)
USPC ............................. 235/492; 156/281; 156/311

(58) Field of Classification Search
CPC ................... G06K 19/07749; G06K 19/0775; G06K 19/077
USPC ............................................ 235/492
See application file for complete search history.

(56) References Cited

U.S. PATENT DOCUMENTS

| | | | | |
|---|---|---|---|---|
| 8,350,703 | B2* | 1/2013 | Gengel et al. ............ | 340/572.7 |
| 2006/0073312 | A1* | 4/2006 | Hattori ..................... | 428/195.1 |
| 2007/0234918 | A1* | 10/2007 | Hirahara et al. .......... | 101/483 |
| 2010/0018640 | A1* | 1/2010 | Simons ..................... | 156/235 |
| 2011/0017834 | A1* | 1/2011 | Schulze-Hagenest et al. ....................... | 235/492 |
| 2012/0043386 | A1* | 2/2012 | Gotou ...................... | 235/492 |

FOREIGN PATENT DOCUMENTS

JP    4531183    6/2010

\* cited by examiner

*Primary Examiner* — Philip Tucker
*Assistant Examiner* — Carson Gross
(74) *Attorney, Agent, or Firm* — Lucas & Mercanti, LLP

(57) ABSTRACT

The non-contact information recording medium is made by forming the antenna circuit and connecting it to the IC module through connection terminals at the same time. This provides a high degree of freedom of patterning of the antenna circuit. The antenna circuit is formed on a recording substrate, in which an IC module has been embedded. A foil-bonding resin layer is formed on the connection terminals of the recording substrate, with a toner containing a binder resin by an electrophotographic method. Then a conductive foil is brought into contact with the foil-bonding resin layer to bond the foil to the resin layer, to connect the antenna circuit to the connection terminals and form the antenna circuit composed of the conductive foil.

14 Claims, 3 Drawing Sheets

PRODUCTION PROCESS OF NON-CONTACT INFORMATION RECORDING MEDIUM

CROSS REFERENCE TO RELATED APPLICATION

This Application claims the priority of Japanese Patent Application No 2011-147143 filed on Jul. 1, 2011, which is incorporated by reference herein.

TECHNICAL FIELD

The present invention relates to a production process of a non-contact information recording medium by bonding a conductive foil with a toner on to a recording substrate, in which an IC module has been embedded, by an electrophotographic method to form an antenna circuit.

BACKGROUND ART

With the development of an information society in recent years, information is recorded in a card, to conduct information management and settlement of accounts making use of this card. In addition, information is recorded in a label to be stuck on goods or the like to manage the goods or the like making use of this label.

As a tool for the information management making use of such a card or label, a non-contact information recording medium such as a non-contact type IC card or non-contact type IC label, in which an IC (integrated circuit) capable of writing and reading information in a state brought into no contact with the card or label has been mounted, is going to rapidly spread because of its excellent convenience.

Examples of the non-contact information recording medium capable of writing and reading information in the non-contact state include those of an electromagnetic coupling system utilizing mutual induction of coils by an alternating current magnetic field, an electromagnetic induction system, utilizing induced electromotive force icy dielectric magnetic fluxes of two coils, a microwave system that data is sent and received through a microwave, an electrostatic coupling system that a side of card or label, and an antenna of another side where information is written and read and which is provided externally are charged by the principle of capacitor to conduct communication and an optical system, using energy modulation, of light that near infrared light is blinked at a high speed. Among these, that of the electromagnetic induction system is often, utilized because it is excellent in transmissibility and high in reliability of data transmission.

The non-contact information recording medium of the electromagnetic induction system is fabricated by forming an antenna circuit of a coil shape peripherally extending on the surface of a recording substrate and mounting an IC module in a state electrically connected to this antenna circuit. In this non-contact information recording medium, induced electromotive force is generated in the antenna circuit by fluctuation of an ambient magnetic field utilizing an electromagnetic wave, whereby the antenna circuit is caused to function as a power source of the IC module, and at the same time, a signal emitted from the IC module is supplied to the antenna circuit, whereby information transmission, for example, reading of information recorded in the IC module and/or writing of new information in the IC module, is conducted.

The non-contact information recording medium of such an electromagnetic induction system has heretofore been produced by separately preparing an antenna circuit by etching (See Patent Literature 1), screen printing or the like, bonding this antenna circuit to a recording substrate and further electrically connecting connection terminals, and so its working process is highly complicated.

CITATION LIST

Patent Literature

Patent Literature 1: Japanese Patent No. 4531183

SUMMARY OF INVENTION

Technical Problem

The present invention has been made in view of the foregoing circumstances and has its object the provision of a production process of a non-contact information recording medium, by which an antenna circuit can be simply formed and at the same time, connected to an IC module through connection terminals, and high degree of freedom of patterning of the antenna circuit is attained.

Solution to Problem

According to the present invention, there is provided a production process of a non-contact information recording medium by forming an antenna circuit on a recording substrate, in which an IC module has been embedded, and connecting the antenna circuit to the IC module through connection terminals, the process comprising the steps of:

forming a foil-bonding resin layer to bond the antenna circuit in a state brought into contact with at least the connection terminals on the recording substrate, in which the IC module, to which the connection terminals have been connected, has been embedded, with a toner comprising a binder resin by an electrophotographic method and bringing a conductive foil into contact with the foil-bonding resin layer to bond the foil on to the resin layer by conducting at least pressing, thereby connecting the antenna circuit to the connection terminals to form the antenna circuit composed, of the conductive foil.

In the production process of the non-contact information recording medium according to the present invention, the binder resin forming the toner may contain a thermoplastic resin, and the antenna circuit composed of the conductive foil may be formed and the antenna circuit may be connected to the connection terminals on the recording substrate by bringing the conductive foil into contact with the foil-bonding resin layer and conducting heating and pressing in the step of forming the antenna circuit.

According to the present invention, there is also provided a production process of a non-contact information recording medium by forming an antenna circuit on a recording substrate, in which an IC module has been embedded, and connecting the antenna circuit to the IC module through connection terminals, the process comprising the steps of:

forming a foil-bonding resin layer to bond the antenna circuit in a state brought into contact with at least the connection terminals on the recording substrate, in which the IC module, to which the connection terminals have been connected, has been embedded, by conducting heating and fixing with a toner comprising a binder resin containing a thermoplastic resin by an electrophotographic method and bringing a conductive foil into contact with the foil-bonding resin layer and heating, thereby connecting the antenna circuit to the connection terminals to form the antenna circuit composed of the conductive foil.

In the production process of the non-contact information recording medium according to the present invention, the conductive foil may preferably be a metal foil, and particularly be a metal foil having an adhesive layer.

In the production process of the non-contact information recording medium, according to the present invention, the toner may be conductive.

In the production process of the non-contact information recording medium according to the present invention, the toner may contain carbon black.

In the production process of the non-contact information recording medium, according to the present invention, the foil-bonding resin layer may be formed, to cover a portion of the connection terminal, and an end portion, of the antenna circuit may be brought into contact with another portion of the connection terminal than said portion, covered by the foil-bonding resin layer.

In the production process of the non-contact information recording medium according to the present invention, an insulating protective layer may preferably be formed after the step of forming the antenna circuit is conducted.

In the production process of the non-contact information recording medium according to the present invention, temperature for heating and fixing for forming the foil-bonding resin layer may be higher than heating temperature in the step of forming the antenna circuit.

Advantageous Effects of Invention

According to the production process of the non-contact information recording medium of the present invention, the conductive foil is bonded to the recording substrate and the connection terminals with the toner comprising the binder resin by the electrophotographic method where the toner is utilized as a bonding agent, so that the antenna circuit composed of the conductive foil is electrically connected to the IC nodule at the same time as the antenna circuit is formed, and so the antenna circuit can be simply formed without need of a complicated working process.

In addition, since the antenna circuit is formed by utilizing the electrophotographic method, the degree of freedom of patterning of the antenna circuit is high. Accordingly, the production process of the non-contact information recording medium of the present invention is suitable for on-demand printing.

BRIEF DESCRIPTION OF DRAWINGS

FIGS. 1-3 illustrate the production process of an exemplary non-contact information recording medium according to the present invention, in which FIG. 3b is a cross-sectional view taken along line Z-Z in FIG. 3a.

DESCRIPTION OF EMBODIMENTS

Figure 1A:
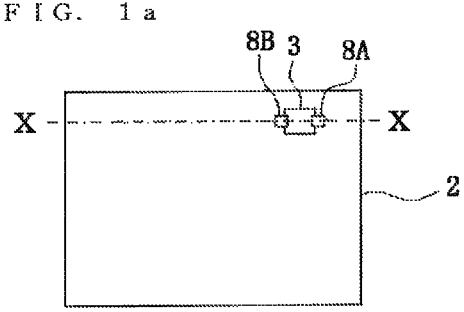
FIG. 1a is an explanatory plan view of a recording substrate in which, an IC module has been embedded.
Figure 1B:
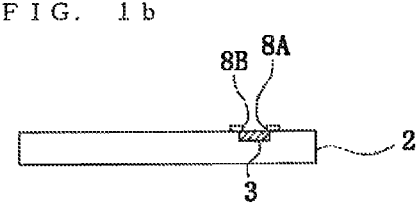
FIG. 1b is a cross-sectional view taken along line X-X in FIG. 1a, FIG. 2a is an explanatory plan view illustrating a state that a foil-bonding resin layer has been, formed.
Figure 2A:
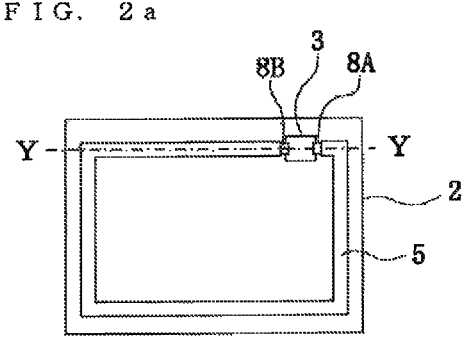
Figure 2B:
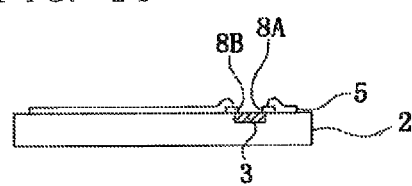
FIG. 2b is a cross-sectional, view taken along line Y in FIG. 2a, FIG. 3a is an explanatory plan view illustrating a state that a conductive foil has been bonded.

In the present invention, a process in which a foil-bonding resin layer is formed, and a conductive foil is brought into contact with the foil-bonding resin layer to bond the foil on to the resin layer, thereby connecting the antenna circuit to the connection terminals to form the antenna circuit composed of the conductive foil may be divided into (1) a foil-bonding resin layer forming step and (2) an antenna circuit forming and connecting step as will be described subsequently.

The foil-bonding resin layer formed in the foil-bonding resin layer forming step (1) may be formed by heating and fixing a toner (see a first embodiment) or may be formed by a toner in an unfixed powder state (see a second embodiment). However, the foil-bonding resin layer is preferably formed by heating and fixing the toner because a conductive foil is bonded in a state that the foil-bonding resin layer has been fixed on a recording substrate, whereby high, positional accuracy can be achieved, to form a high-definition antenna circuit.

The present invention will hereinafter be described specifically.

First Embodiment

The production process of the non-contact information recording medium according to the first embodiment of the present invention is a process for producing a non-contact information recording medium by forming an antenna circuit 7 on a recording substrate 2, in which an IC module 3 has been embedded, and connecting the antenna circuit 7 to the IC module 3 through connection terminals 8A and 8B as illustrated in FIGS. 1a-3b, the process having: (1) a foil-bonding resin layer forming step of forming a foil-bonding resin layer 5 to bond the antenna circuit 7 in a state brought into contact with at least the connection terminals 8A and 8B on the recording substrate 2 (see FIG. 1a and FIG. 1b), in which the IC module 3, to which the connection terminals 8A and 8B have been connected, has been embedded, by conducting heating and fixing with a toner comprising a binder resin containing a thermoplastic resin by an electrophotographic method (see FIG. 2a and FIG. 2b), and (2) an antenna circuit forming and connecting step of bringing a conductive foil 80c (see FIG. 6) into contact with the foil-bonding resin layer 5 and heating, thereby connecting the antenna circuit 7 to the connection terminals 8A and 8B to form the antenna circuit 7 composed of the conductive foil 80c (see FIG. 3a and FIG. 3b).

Recording Substrate

The recording substrate 2 may be any substrate so far as the IC module 3 can be embedded therein, and the antenna circuit 7 can be held through the foil-bonding resin layer 5. As specific examples thereof, may be mentioned paper substrates such as plain paper, cardboard, woodfree paper, coated printing paper such as art paper or coat paper, and corrugated board; and resin substrates such as vinyl chloride resins, polyester resins, polyethylene resins, polypropylene resins, polystyrene resins and polyimide resins.

The thickness of the recording substrate 2 may be controlled to, for example, 0.01 to 5 mm, and no particular limitation is imposed on the size of the recording substrate 2.

A specific example of the dimensions of the recording substrate 2 of rectangular shape is 54 mm in length, 85 mm in width and 500 μm in thickness.

IC Module

No particular limitation is imposed on the form of the IC module 3 so far as it is equipped with desired functions such as reading and writing of information. However, the IC module preferably has a thickness capable of being embedded in the recording substrate 2, for example, a thickness of 10 to 400 μm.

The IC module 3 is preferably embedded in the recording substrate 2 in a state having no portion projected from the recording substrate 2 from the viewpoint of providing a non-contact information recording medium having a surface free of a difference in level.

Specifically, the IC module 3 is held in a state embedded, in the recording substrate 2 by arranging it in a depression opened to the surface of the recording substrate 2 and having a shape that internal dimensions thereof conform to external dimensions of the IC module 3.

Connection Terminal

The connection terminals 8A and 6B may be in the form of, for example, a flat plate, a rectangular parallelepiped, a cube or a column, and no particular limitation is imposed on the size and shape thereof.

A material for forming the connection terminals 8A and 8B is conductive, and specific examples of the material include stainless steel, iron, copper, aluminum and brass.

A specific example of the dimensions of the connection terminals 8A and 8B is 1 mm in length, 3 mm in width and 100 μm in thickness.

The connection terminals 8A and 8B are electrically connected to the IC module 3, and at least parts thereof are exposed to the surface of the recording substrate 2.

(1) Foil-Bonding Resin Layer Forming Step:

In this foil-bonding resin layer forming step, a foil-bonding resin layer 5 to bond the antenna circuit 7 in a state brought into contact with at least the connection terminals 8A and 8B is formed on the recording substrate, in which the IC module, to which the connection, terminals 8A and 8B have been connected, has been embedded, by conducting heating and fixing a toner image which forms the foil-bonding resin layer 5 and is formed with, a toner comprising a binder resin containing a thermoplastic resin by an electrophotographic method.

Specifically, the foil-bonding resin layer 5 can be formed by means of a toner image forming section 10 and a fixing device 50 of an antenna circuit forming apparatus which will be described in detail subsequently.

Antenna Circuit Forming Apparatus

Figure 4:
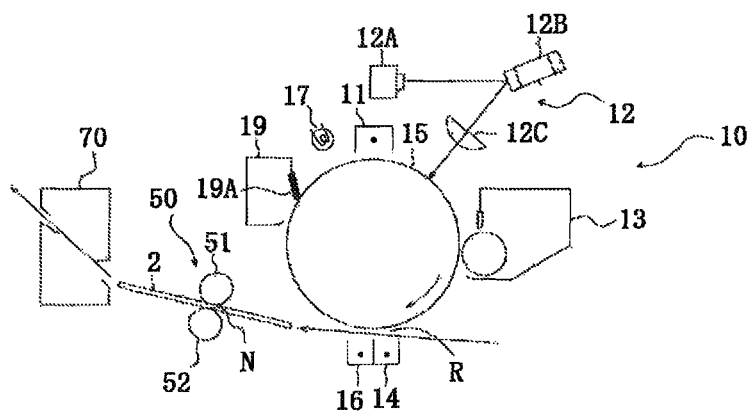
FIG. 4 is an explanatory cross-sectional view illustrating the construction of an exemplary antenna circuit forming apparatus for performing the production process of the non-contact information recording medium according to the present invention.

FIG. 4 is an explanatory cross-sectional view illustrating the construction of an exemplary antenna circuit forming apparatus for performing the production process of the non-contact information recording medium according to the present invention.

This antenna circuit forming apparatus has a toner image forming section 10 for forming a toner image to form a foil-bonding resin layer 5 in the form based on the antenna, circuit 7 to be formed and transferring the toner image to the recording substrate 2, a fixing device 50 for fixing the toner image by pressing and heating the recording substrate 2, on which the toner image has been, formed, and a foil transferring device 70 for supplying a conductive foil 80c and heating to bond the conductive foil 80c to the recording substrate 2.

The toner image forming section 10 is equipped with a photosensitive member 15 that is an electrostatic latent image-bearing member, a charging unit 11 that applies a uniform potential to the surface of the photosensitive member 15, an exposing unit 12 that forms an electrostatic latent image having a desired form on the photosensitive member 15 uniformly charged and is composed of a semiconductor laser light source 12A, a polygon mirror 12B and an f0 lens 12C, a developing unit 13 that carries a toner on the photosensitive member 15 to make the electrostatic latent image visible, a transferring unit 14 for transferring a toner image formed by the developing unit 13 to the recording substrate 2, a separating unit 16 for separating the recording substrate 2, to which the toner image has been transferred, from the photosensitive member 15, a cleaning unit 19 that recovers a residual, toner remaining on the photosensitive member 15 after the transferring and has a cleaning blade 19A composed, of a rubbery elastic body, and an ante-charge exposing unit (PCL) 17.

The fixing device 50 is composed of a pair of heating and pressing rollers 51 and 52 provided in a state brought into contact under pressure with each other to form a nip portion N at the contact portion under pressure.

In the toner image forming section 10 and the fixing device 50 of such an antenna circuit forming apparatus, the foil-bonding resin layer forming step (1) is performed in the following manner.

First, in the toner image forming section 10, an electrostatic latent image based on the form, of the antenna circuit 7 to be formed is formed on the photosensitive member 15 by conducting charging by the charging unit 11 and exposure by the exposing unit 12, and the electrostatic latent image is developed with a toner in the developing unit 13, thereby forming a toner image.

On the other hand, the recording substrate 2, in which the IC module has been embedded in advance and which is stored in a paper cassette not illustrated, is conveyed in a transferring region R with exact timing by a conveying unit not illustrated, the toner image on the photosensitive member 15 is transferred, to a position where the antenna circuit 7 should be formed on the recording substrate 2 by the transferring unit 14 in the transferring region R, and the recording substrate 2, to which the toner image has been transferred, is further separated from the photosensitive member 15 by the separating unit 16.

Then, the recording substrate 2 separated is conveyed to the nip portion N of the fixing device 50 and pressed and heated in the nip portion. N, whereby the toner image is fixed to form the foil-bonding resin layer 5.

After the toner image is transferred to the recording substrate 2, a toner remaining on the surface of the photosensitive member 15 is removed by the cleaning unit 19, a remaining charge is further removed by the ante-charge exposing unit 17, and the photosensitive member 15 is then used in the formation of the next toner image.

Fixing conditions of the fixing device 50 vary according to the kind of the toner used, but may be set, for example, in the following manner.

Heating temperature: 150 to 220° C.
Nipping time: 10 to 200 msec.

Incidentally, the nipping time is calculated out from [Length (mm) of the nip portion N between the heating and pressing rollers 51 and 52 in a conveying direction]/[Linear speed, (mm/sec)]×1,000.

The heating temperature means a surface temperature of the heating and pressing roller 51 coming into contact with a surface of the recording substrate 2, to which the toner image has been transferred.

The heating temperature in the foil-bonding resin layer forming step is preferably higher than the heating temperature in the antenna circuit forming and connecting step.

Foil-Bonding Resin Layer

The foil-bonding resin layer 5 is formed so as to nave a form based on the desired antenna circuit 7.

The thickness of the foil-bonding resin layer 5 is preferably controlled to, for example, 0.01 to 100 μm. The thickness of the foil-bonding resin layer 5 falls within this range, whereby the electrical connection between the conductive foil 80c and the connection terminals 3A and SB is easy to surely achieve while being able to surely bond the conductive foil 80c to the recording substrate 2. On the other hand, it the thickness of the foil-bonding resin layer 5 is too small, there is a possibility that the conductive foil 30c may not be bonded to the recording substrate 2 because its insufficient adhesive force. If the thickness of the foil-bonding resin layer 5 is too large, there is a possibility that the electrical connection between the conductive foil 80c and the connection terminals 8A and 8B may not be sufficiently achieved.

A specific example of the shape and dimensions of the foil-bonding resin layer 5 in the above-described antenna circuit 7 is a substantially rectangular form in which a width is 1 mm, a maximum length of a short side is 50 mm, and a maximum length of a long side is 80 mm.

Toner

In the present invention, the toner is such that an action as an adhesive for bonding the conductive foil 80c on to the connection terminals 8A and 8B and the recording substrate 2 is developed and contains at least a binder resin comprising a thermoplastic resin, Thermoplastic Resin As examples of the thermoplastic resin contained in the binder resin making up the toner, may be mentioned publicly known various thermoplastic resins such as vinyl resins such as styrene resins, (meth)acrylic resins, styrene-(meth)acrylic copolymer resins and olefin resins, polyester resins, polyamide resins, polycarbonate resins, polyether resins, polyvinyl acetate resins, polysulfone resins, and polyurethane resins. These resins may be used either singly or in any combination thereof.

The thermoplastic resin may be a crystalline resin having a melting point, a non-crystalline resin having a glass transition point without having a melting point or a mixture thereof.

The softening point of the toner is preferably 90 to 130° C.

The toner has such a softening point as described above, whereby the IC module 3 is not damaged though moderate adhesiveness is achieved when heat is applied in the foil-bonding treatment. In particular, a lower softening point within the above range is preferred because the quantity of heat required for heating upon bonding of the conductive foil 80c can be reduced.

On the other hand, if the softening point is too low, there is a possibility that the resulting antenna circuit may be separated according to a service environment of product. If the softening point is too high, a high quantity of heat is required to bond the conductive foil, so that there is a possibility that adhesion failure may be caused, that an environmental load may become great, or that the IC module may be broken by heat.

The softening point of the toner may be controlled by the kind of the binder resin, the kind and used proportion of a raw material for obtaining the binder resin, the control of a molecular weight of the binder resin, etc.

The softening point of the toner is measured by a flow teeter method.

Specifically, 1.1 g of a sample (toner) to be measured is first placed in a Petri dish under an environment of 20±1° C. in temperature and 50±5% in relative humidity (RH), smoothed, left to stand, for 12 hours or longer and then pressurized for 30 seconds with force of 3,820 kg/cm$^2$ by a molding machine "SSP-A" (manufactured by Shimadzu Corporation) to prepare a columnar molded sample having a diameter of 1 cm. This molded sample is then extruded from a hole (1 mm in diameter×1 mm) of a columnar die by means of a piston, having a diameter of 1 cm after preheating is completed under conditions of a load, of 196 H (20 kgf), a starting temperature of 60° C., a preheating time of 300 seconds and a heating rate of 6° C./min by a flow fester "CFT-500D" (manufactured by Shimadzu Corporation) under an environment of 24±5° C. in temperature and 50±20% in relative humidity (RH) to regard an offset method temperature $T_{offset}$ measured with an offset value set to 5 mm according to a melting temperature measuring method of a temperature-programmed method as the softening point.

The toner used in the present, invention may be either conductive or insulating. However, a conductive toner is preferred from the viewpoint of electrical conductivity.

The conductive toner may be composed of, for example, toner particles with line conductive particles dispersed in a binder resin.

As examples of the fine conductive particles, may be mentioned carbon black, iron powder, magnetite, aluminum powder and copper powder.

The content of the fine conductive particles in the toner particles is preferably 1 to 30 parts by mass per 100 parts by mass of the binder resin.

The insulating toner means a toner which does not contain such fine conductive particles as described above, Production Process of Toner No particular limitation is imposed on a process for producing the toner, and as examples thereof, may be mentioned publicly known processes such as a kneading-pulverization process, a suspension polymerization process, an emulsion aggregation process, an emulsion association process, a mini-emulsion polymerisation aggregation process, etc.

Particle Size of Toner Particles

The particle size of the toner particles making up the toner is, for example, preferably 3 to 10 μm, more preferably 5 to 8 μm in terms of a volume-based median diameter.

The volume-based median diameter of the toner particles is measured and calculated by means of an apparatus with a computer system (manufactured by Beckmann Coulter Co.), in which a data processing software "Software V3.51" is mounted, connected to "Coulter Counter Multisizer 3" (manufactured by Beckmann Coulter Co.).

The measuring procedure is as follows: After 0.02 g of a sample (toner) to be measured is caused to be intimate with 20 mL of a surfactant solution (for example, a surfactant solution obtained by diluting a neutral detergent containing a surfactant component with pure water to 10 times for the purpose of dispersing the sample to be measured), ultrasonic dispersion is conducted for 1 minute to prepare a toner dispersion. This toner dispersion is poured into a beaker, in which "ISOTON II" (product of Beckmann Coulter Co.) has been placed, within a sample stand by a pipette until an indicator concentration of the measuring device reaches 5% to 10%. The concentration is controlled to this range, whereby a reproducible measured value can be obtained. In the measuring device, the number of particles to be measured is counted as 25,000 particles, and an aperture diameter is controlled to 100 μm to calculate out frequency values with a range of 2.0 to 60 μm that is a measuring range divided into 256 portions. A particle size of 50% from the largest integrated volume fraction is regarded as a volume-based median diameter (volume $D_{50}$% diameter).

(2) Antenna Circuit Forming and Connecting Step:

In this antenna circuit forming and connecting step, a conductive foil 80c is brought into contact with the foil-bonding resin layer 5 formed, in the foil-bonding resin layer forming step (1), and they are heated, whereby the antenna circuit 7 composed of the conductive foil 80c is formed, and at the same time an end portion of the antenna circuit 7 is electrically connected to a connection terminal 8A on a positive electrode side, and the other end portion thereof is electrically connected, to a connection terminal. 8B on a negative electrode side.

Specifically, the antenna circuit 7 can be formed by means of a foil transferring device 70, which will be described in detail subsequently, in the above-described, antenna circuit forming apparatus.

Figure 5:
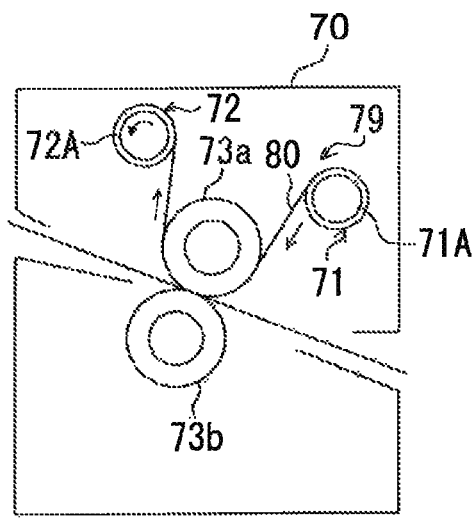
FIG. 5 is an explanatory cross-sectional view illustrating the construction of an exemplary foil transferring apparatus.

As illustrated in FIG. 5, the foil transferring device 70 is composed of a foil transferring roller 73a driven by a proper driving unit and rotated in a clockwise direction and a foil transferring roller 73b rotated following the rotation of the foil transferring roller 73a, which are provided in a state brought into contact under pressure with each other through a continuous sheet-like foil 80 (see FIG. 6) to be transferred, which has a conductive foil 80c to be supplied to the recording substrate 2, and a conveying unit 79 for causing this foil 80 to be transferred to travel.

The conveying unit 79 for causing the foil 80 to be transferred to travel is composed of a delivery section 71 having a delivery roller 71A on which the foil 80 to be transferred is wound and to which a backward tension is applied for preventing the foil 80 to be transferred from loosening and a take-up section 72 having a take-up roller 72A rotated, in a counter-clockwise direction (direction of an arrow in FIG. 5) by a driving source, and these rollers are arranged in such a manner that the traveling direction of the foil 80 to be transferred becomes the same as the moving direction of the surface of the foil transferring roller 73a.

The rotational speed of the take-up roller 72A in the conveying unit 79 is controlled in such a manner that the conveying speed of the foil 80 to be transferred at the contact portion under pressure between the foil transferring rollers 73a and 73b becomes the same as the conveying speed of the recording substrate 2 at the contact portion under pressure.

The foil transferring rollers 73a and 73b nave the same function as the heating and pressing rollers, and a heating source not illustrated is provided in at least one of the foil transferring rollers 73a and 73b.

Conductive Foil

In the present invention, the conductive foil 80c is submitted as the foil 80 to be transferred for the antenna circuit forming and connecting step.

Figure 6:
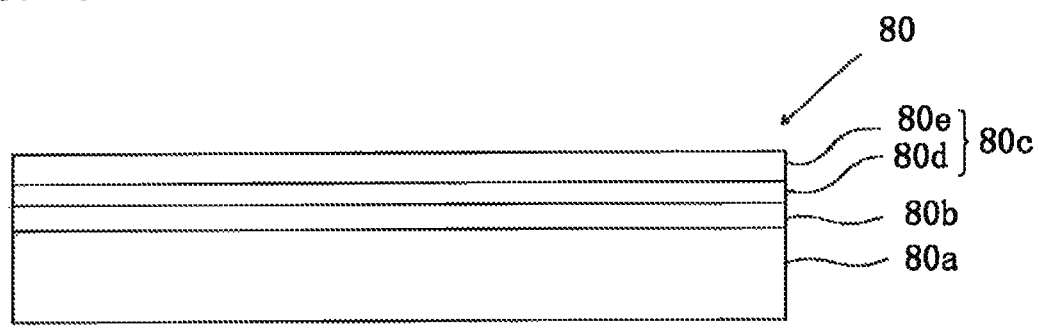
FIG. 6 is an explanatory cross-sectional view illustrating a sectional structure of a foil to be transferred, which is used in the production process of the non-contact information recording medium according to the present invention.

Specifically, the foil 80 to be transferred preferably has a layer structure that the conductive foil 30c is formed on a filmy base material 80a composed of a resin or the like through a release layer 80b as illustrated in FIG. 6.

Specifically, the conductive foil 80c is composed of a foil layer 80d formed on the release layer 80b and formed of a conductive material and an adhesive layer 80e formed on the foil layer 80d and developing adhesion property. This adhesive layer 80e is preferably conductive.

The base material 80a is composed of a film or sheet formed of a resin or the like, or paper. When, the base material 80a is composed of the resin, examples of a resin material include publicly known resin materials such as polyethylene terephthalate (PET) resins, polyethylene naphthalate (PEN) resins, polypropylene (PP) resins, poly(ether sulfone) resins and polyimide resins.

The base material 80a may be either of a single-layer structure or of a multi-layer structure.

The release layer 80b is used for ensuring good releasability of the conductive foil 80c composed of the foil layer 80d and the adhesive layer 80e from the base material 80a, and examples of a material forming this release layer 80b include thermosetting resins using melamine or isocyanate as a hardener and resin materials obtained by adding a publicly known wax such as, for example, a fluorine- or silicon-containing monomer or polymer to an ultraviolet- or electron radiation-curing resin containing an acrylic or epoxy resin.

The foil layer 80d is conductive and preferably low in electric resistance and specifically is preferably a metal layer.

The metal layer can be formed, by a publicly known process such as, for example, a vapor deposition process, sputtering process or ion plating process. As a metal material for forming the metal layer, may be used, for example, a simple substance such as silver, steel, aluminum, tin, chrome, nickel or gold, or an alloy such as a nickel-chrome-iron alloy, bronze or aluminum bronze.

The thickness of the foil layer 80d may be, for example, 20 to 4,000 nm.

The adhesive layer 80e may be formed of, for example, a material obtained by containing a conductive material in a heat-sensitive adhesive called what is called, a hot-melt type that adhesion property is developed by heating. Examples of the heat-sensitive adhesive include publicly known various thermoplastic resins that can be used in hot-melt type adhesives, such as acrylic resins, vinyl chloride-vinyl acetate copolymers, epoxy resins and ethylene-vinyl alcohol copolymers.

The adhesive layer 80e is preferably formed by applying a coating liquid with the conductive material dispersed in the thermoplastic resin making up the heat-sensitive adhesive on to the foil layer 80d by means of, for example, a gravure coater, micro-gravure coater or roll coater.

The thickness of the adhesive layer 80e is preferably, for example, 5 to 100 nm.

In such foil transferring device 70 of the antenna circuit forming apparatus as described above, the antenna circuit forming and connecting step (2) is performed in the following manner.

First, the foil 80 to be transferred in a state wound on the delivery roller 71A is conveyed by driving and rotating the take-up roller 72A to wind the foil 80 so as to pass through the contact portion under pressure between the foil transferring rollers 73a and 73b along a conveying path by the conveying unit 79.

At the contact portion under pressure between the foil transferring rollers 73a and 73b, the thus-conveyed foil 80 to be transferred is then laminated on the recording substrate 2, on which the foil-bonding resin layer 5 has been formed, in a state brought into contact with the surface of the foil-bonding resin layer 5. In this state, the foil 80 and the recording substrate 2 are heated by the foil transferring rollers 73a and 73b and naturally cooled after passed through the contact portion under pressure between the foil transferring rollers 73a and 73b, whereby the conductive foil 80c is bonded, on to the foil-bonding resin layer 5, and a portion, of the conductive foil 80c of the foil 80 to be transferred, with which the foil-bonding resin layer 5 is brought into no contact, is removed, thereby forming an antenna circuit 7 in the form substantially conforming to the pattern form of the foil-bonding resin layer 5.

The portion of the conductive foil 80c of the foil 80 to be transferred, with which the foil-bonding resin layer 5 is brought into no contact, is wound on the take-up roller 72A together with the base material 80a and the release layer 80b.

The thus-obtained antenna circuit 7 is one that has been bonded in a state that one end portion including end surface 80α in a longitudinal direction to which the antenna circuit 7 extends and the other end portion including end surface 80β nave been brought into contact with respective parts of the connection terminals 8A and 8B.

Figure 3A:
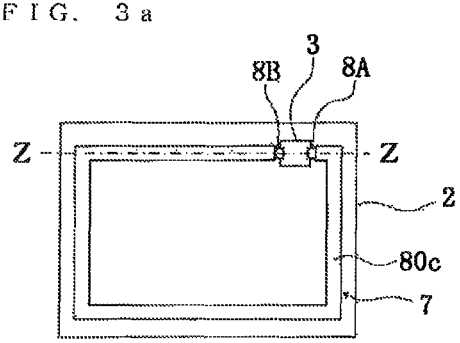
Figure 3B:
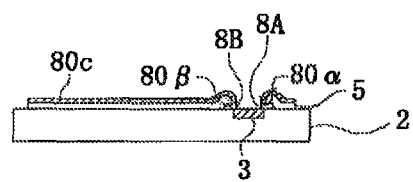

Specifically, the foil-bonding resin layer 5 is formed in a state brought into contact with parts of upper surfaces of the connection terminals 8A and 83, and the conductive foil 80c is bonded to an upper surface and side surfaces of the foil-bonding resin layer 5 as illustrated in FIG. 3b, whereby one end surface 80α and the other end surface 80β in the longitudinal direction of the antenna circuit 7 are naturally respectively brought into contact with other parts than said parts, specifically, parts adjoining said parts of the upper surfaces of the connection terminals 8A and 8B. Electrical connection between the conductive foil 80c and the connection terminals 8A and 8B is thereby made even if the toner is an insulating toner.

Heating conditions in the foil transferring device 70 vary according to the kind of the toner used, but may be set, for example, in the following manner.
Heating temperature: 140 to 210° C.
Nipping time: 10 to 4,000 msec.

Incidentally, the nipping time is calculated out from [Length (mm) in a conveying direction of the contact portion under pressure between the foil transferring rollers 73a and 73b]/[Linear speed (mm/sec)]×1,000.

The heating temperature means a surface temperature of the foil transferring roller 73a coming into contact with a surface of the recording substrate 2, on which the foil-bonding resin layer 5 has been formed.

The heating temperature in the antenna circuit forming and connecting step is preferably lower than the heating temperature in the foil-bonding resin layer forming step for keeping the pattern of the foil-bonding resin layer formed.

Antenna Circuit

The antenna circuit 7 has a form extending along a peripheral edge on the surface of the recording substrate 2 and is composed of a linear conductive foil 80c bonded on to the foil-bonding resin layer 5.

Specifically, the antenna circuit is formed into, for example, a substantially rectangular circle shape as a whole. Incidentally, the route form of the antenna circuit 7 is not limited to the substantially rectangular shape and may be, for example, a circular shape or ellipsoidal shape.

When the antenna circuit 7 is formed into the substantially rectangular shape as a whole, specifically, one end portion of the antenna circuit 7 is located on the connection terminal SA when viewed planarly, an intermediate portion is rectangularly extended once along the peripheral edge of the recording substrate 2, and the other end portion of the antenna circuit 7 is arranged so as to be located on the connection terminal 8B.

In the antenna circuit. 7, the conductive foil 80c has no crossing position.

The antenna circuit 7 is arranged along the peripheral edge of the recording substrate 2, whereby the effective area of the antenna circuit 7 can be widely ensured, so that a magnetic flux going through the antenna circuit 7 can be made large. Accordingly, the induced electromotive force of the resulting non-contact information recording medium can be made high, and output related to information transmission with an external communication unit can be improved to obtain a long communication range. In the present invention, the degree of freedom, of patterning of the antenna circuit is high. Accordingly, when that having a complicated shape is used as the recording substrate, the antenna circuit, is arranged along the peripheral edge of the recording substrate, whereby the area of the recording substrate can be effectively utilized to widely ensure the effective area of the antenna circuit.

The number of times that the antenna circuit is extended along the periphery of the recording substrate may be once or more though it varies according to a desired communication range and is preferably determined to be, for example, 1 to 30 times. When the number of times is more, antenna efficiency can be made higher to obtain a longer communication range.

The width of the conductive foil 80c forming the antenna circuit 7 may be, for example, 0.05 to 5 mm.

A specific example of the dimensions of the antenna circuit 7 is 1 mm in width, 5 μm in thickness, 50 mm in maximum length of a short side and 80 mm in maximum length of a long side.

(3) Protective Layer Forming Step:

In the production process of the non-contact information recording medium according to the present invention, a protective layer forming step of forming an insulating protective layer covering the antenna circuit 7 alone or covering the whole surface of the IC module 3, the connection terminals 8A and 8B, the antenna circuit 7 and the recording substrate 2 may also be performed, as needed, after the antenna circuit forming and connecting step (2) for the purpose of providing a non-contact information recording medium high in durability.

According to such production process of the non-contact information recording medium as described above, the conductive foil 80c is bonded to the recording substrate 2 and the connection terminals 8A and 8B using the toner comprising the thermoplastic resin by the electrophotographic method where the toner is utilized, as a bonding agent, so that the antenna circuit 7 composed of the conductive foil 80c is electrically connected to the IC module 3 at the same time as the antenna circuit 7 is formed, and so the antenna circuit 7 can be simply formed without need of a complicated working process.

In addition, since the antenna circuit 7 is formed by utilizing the electrophotographic method, the degree of freedom of patterning of the antenna circuit 7 is high. Accordingly, the production process is suitable for on-demand printing.

Second Embodiment

The production, process of the non-contact information recording medium according to the second embodiment of the present invention is a process for producing a non-contact information recording medium in the same manner as in the first embodiment except that the foil-bonding resin layer 5 is formed in what is called an unfixed powder state without heating and fixing it by the electrophotographic method.

Specifically, the same apparatus as the above-described antenna circuit forming apparatus except that the fixing device 50 is not provided is used to form a toner image on a recording substrate 2 by the toner image forming section 10, the toner image is submitted as the foil-bonding resin layer 5 without heating and fixing it for the antenna circuit forming and connecting step (2), and a conductive foil 80c is pressed and heated in a state brought into contact with the foil-bonding resin layer 5 by the foil transferring device 70 in the antenna circuit forming and connecting step (2), whereby the foil-bonding resin layer 5 is heated and fixed on the recording substrate 2 and the connection terminals 8A and 8B, and the conductive foil 80c is bonded to the foil-bonding resin layer 5.

In this second embodiment, the binder resin of the toner used may also be composed of a thermosetting resin alone without containing a thermoplastic resin.

Examples of the thermosetting resin usable as the binder resin of such a toner include epoxy resins, urea resins, phenol resins, melamine resins, benzoguanamine resins, unsaturated polyester resins, alkyd resins, polyurethane resins, polyimide resins and curing acrylic resins. These thermosetting resins may be used either singly or in any combination thereof.

The embodiments of the present invention nave been specifically described above. However, embodiments of the present invention are not limited, to the above embodiments, and various changes or modifications may be added thereto.

EXAMPLES

Specific Examples of the present invention will hereinafter be described. However, the present invention is not limited thereto.

Example 1

A modified machine with such a foil transferring advice as illustrated in FIG. 5 installed in a commercially available digital image forming apparatus "bizhub PRESS C8000" (manufactured by Konica Minolta Business Technologies, Inc.) was used as an antenna circuit forming apparatus to form a foil-bonding resin layer in the form based on an antenna circuit of the form illustrated in FIG. 3a with the following toner [1] on a recording substrate (cardboard "San Platte", product of HOKUETSU PAPER CO., LTD., basis weight: 302 g/m², thickness; 330 μm), in which a rectangular IC module having a thickness of 300 μm had been embedded in advance, and connection terminals each having 1 mm in length, 2 mm in width and 80 μm in thickness and composed of a Cu wire had been provided, in a state electrically connected to one side of the IC module and a side opposing this side, respectively, and a foil (vapor deposited aluminum foil "BL No. 2 Gold 2.8", product of MURATA KIMPAKU CO., LTD. having a structure comprising a base material composed of PET (polyethylene telephthalate), a foil layer composed of a vapor deposited aluminum and an adhesive layer containing an acrylic resin and a polyester resin) to be transferred was brought into contact with this foil-bonding resin layer and heated, according to the following conditions, thereby forming an antenna circuit to obtain a non-contact information recording medium [1].

The toner [1] is composed of a binder resin (styrene-acrylic resin) containing 10% by mass of carbon black (average particle size: 50 nm) in a state dispersed therein. The volume-based median diameter and softening point of this toner is 6.5 μm and 120° C., respectively.

The feed rate of the toner in the antenna circuit forming apparatus was set to 4 g/m².

Example 2

A non-contact information recording medium [2] was obtained in the same manner as in Example 1 except that the same toner as the toner [1] except that the carbon black was not contained was used in place of the toner [1]

Example 3

A non-contact information recording medium [3] was obtained in the same manner as in Example 1 except that the form of the foil-bonding resin layer formed was changed from the form based on the form, of the antenna circuit illustrated in FIG. 3a to the form, based on the form of the following antenna circuit 7α.

Figure 7:
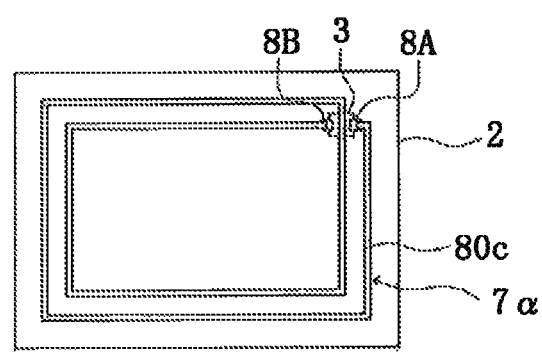
FIG. 7 is an explanatory plan view illustrating the construction of another exemplary non-contact information recording medium according to the present invention.

The antenna circuit 7α has the form illustrated in FIG. 7. Specifically, the form is such that, one end portion of the antenna circuit 7α is located on the connection terminal 8A in a contact state, an intermediate portion is rectangularly extended once along the peripheral edge of the recording substrate 2, caused to pass through between the connection terminal 8A and the connection terminal 8B and extended again along the rectangularly extended portion so as not to come into contact with the extended portion, and the other end portion of the antenna circuit 7α is arranged so as to be located on the connection terminal 8B in a contact state.

Conditions in the fixing device are as follows:
Surface temperature of an upper heating and pressing roller: set to 190° C.
Surface temperature of a lower heating and pressing roller: set to 100° C.
Nip width (length in the conveying direction at the nip portion): 7 mm
Conveying speed (linear speed) of the recording substrate: 100 mm/sec
Nipping time: 70 msec
Conveying direction of the recording substrate: longitudinal direction
Environment: ordinary-temperature and ordinary-humidity environment (temperature: 20° C., relative humidity (RH): 50%).

Conditions in the foil transferring device are as follows:
Surface temperature of an upper foil transferring roller; set to 150° C.
Surface temperature of a lower foil transferring roller: set to 100° C.

Nip width (length in the conveying direction at the contact portion under pressure): 7 mm
Conveying speed (linear speed) of the recording substrate: 100 mm/sec
Nipping time: 70 msec
Conveying direction of the recording substrate: longitudinal direct ion
Environment: ordinary-temperature and ordinary-humidity environment (temperature: 20° C., relative humidity (RH): 50%).

Reading of the resultant non-contact information recording media [1] to [3] was conducted by means of a commercially available IC card reader "PaSoRi RC-S370" (manufactured by Sony Corporation) with a distance between the non-contact information recording media [1] to [3] and the IC card reader set to 10 cm. As a result, it was confirmed that information recorded in the IC module in advance can be read.

Even when the distance between the non-contact information recording media [1] to [3] and the IC card reader was set to 5 cm to conduct reading, it was confirmed that information recorded in the IC module in advance can be read.

When the distance between the non-contact information recording media [1] to [3] and the IC card reader was set to 15 cm to conduct reading, it was confirmed that only information recorded in the IC module in advance in the non-contact information recording medium [3] can be read.

REFERENCE SIGNS LIST

2 Recording substrate
3 IC module
5 Foil-bonding resin layer
7, 7α Antenna circuits
8A, 8B Connection terminals
10 Toner image forming section
11 Charging unit
12 Exposing unit
12A Semiconductor laser light source
12B Polygon mirror
12C fθ lens
13 Developing unit
14 Transferring unit
15 Photosensitive member
16 Separating unit
17 Ante-charge exposing unit
19 Cleaning unit
19A Cleaning blade
50 Fixing device
51, 52 Heating and pressing rollers
70 Foil transferring device
71 Delivery section
71A Delivery roller
72 Take-up section
72A Take-up roller
73a, 73b Foil transferring rollers
79 Conveying unit
80 Foil to be transferred
80a Base material
80b Release layer
80c Conductive foil
80d Foil layer
80e Adhesive layer
80α One end surface
80β Other end surface
N Nip portion
R Transferring region

The invention claimed is:

1. A production process of a non-contact information recording medium by forming an antenna circuit on a recording substrate, in which an IC module has been embedded, and connecting the antenna circuit to the IC module through connection terminals, the process comprising the steps of:
    forming a foil-bonding resin layer to bond the antenna circuit in a state brought into contact with at least the connection terminals on the recording substrate, in which the IC module, to which the connection terminals have been connected, has been embedded, with a toner comprising a binder resin by an electrophotographic method and bringing a conductive foil into contact with the foil-bonding resin layer to bond the foil on to the resin layer by conducting at least pressing, thereby connecting the antenna circuit to the connection terminals to form the antenna circuit composed of the conductive foil,
    wherein the foil-bonding resin layer is formed to cover a portion of the connection terminal and an end portion of the antenna circuit is brought into contact with another portion of the connection terminal other than said portion covered by the foil-bonding resin layer.

2. The production process of the non-contact information recording medium according to claim 1, wherein the binder resin forming the toner contains a thermoplastic resin, and the antenna circuit composed of the conductive foil is formed and the antenna circuit is connected to the connection terminals on the recording substrate by bringing the conductive foil into contact with the foil-bonding resin layer and conducting-heating and pressing in the step of forming the antenna circuit.

3. The production process of the non-contact information recording medium according to claim 1, wherein the conductive foil is a metal foil.

4. The production process of the non-contact information recording medium according to claim 1, wherein the conductive foil is a metal foil having an adhesive layer.

5. The production process of the non-contact information recording medium according to claim 1, wherein the toner is conductive.

6. The production process of the non-contact information recording medium according to claim 1, wherein the toner contains carbon black.

7. The production process of the non-contact information recording medium according to claim 1, wherein an insulating protective layer formed after the step of forming the antenna circuit is conducted.

8. A production process of a non-contact information recording medium by forming an antenna circuit on a recording substrate, in which an IC module has been embedded, and connecting the antenna circuit to the IC module through connection terminals, the process comprising the steps of:
    forming a foil-bonding resin layer to bond the antenna circuit in a state brought into contact with at least the connection terminals on the recording substrate, in which the IC module, to which the connection terminals have been connected, has been embedded, by conducting heating and fixing with a toner comprising a binder resin containing a thermoplastic resin by an electrophotographic method and bringing a conductive foil into contact with the foil-bonding resin layer and heating, thereby connecting the antenna circuit to the connection terminals to form the antenna circuit composed, of the conductive foil,
    wherein the foil-bonding resin layer is formed to cover a portion of the connection terminal, and an end portion of the antenna circuit is brought into contact with another portion of the connection terminal other than said portion covered by the foil-bonding resin layer.

9. The production process of the non-contact information recording medium according to claim 8, wherein the conductive foil is a metal foil.

10. The production process of the non-contact information recording medium according to claim 8, wherein the conductive foil is a metal foil having an adhesive layer.

11. The production process of the non-contact information recording medium according to claim 8, wherein the toner is conductive.

12. The production process of the non-contact information recording medium according to claim 8, wherein the toner contains carbon black.

13. The production process of the non-contact information recording medium according to claim 8, wherein an insulating protective layer is formed after the step of forming the antenna circuit is conducted.

14. The production process of the non-contact information recording medium according to claim 8, wherein temperature for heating and fixing for forming the foil-bonding resin layer is higher than heating temperature in the step of forming the antenna circuit.

* * * * *